United States Patent

Moore

[11] 3,833,301
[45] Sept. 3, 1974

[54] TESTING OF SPHERICAL SURFACES BY HOLOGRAPHIC INTERFERENCE

[75] Inventor: William Thomas Moore, London, England

[73] Assignee: The Rank Organisation Limited, London, England

[22] Filed: May 10, 1973

[21] Appl. No.: 358,969

[30] Foreign Application Priority Data
May 10, 1972   Great Britain.................... 21852/72

[52] U.S. Cl................................. 356/109, 350/3.5
[51] Int. Cl......................... G01b 9/02, G02b 27/00
[58] Field of Search.......... 350/3.5; 356/106 R, 109, 356/2

[56] References Cited
UNITED STATES PATENTS
3,614,189   10/1971   Stewart et al........................ 350/3.5
3,721,498   3/1973   Narodny et al...................... 350/3.5

FOREIGN PATENTS OR APPLICATIONS
1,592,520   6/1970   France................................. 350/3.5

OTHER PUBLICATIONS
Deelen et al., Applied Optics, Vol. 8, No. 5, May 1969, pp. 951–955.

MacGovern et al., Applied Optics, Vol. 10, No. 3, March 1971, pp. 619–624.

Hildebrand et al., Applied Optics, Vol. 6, No. 7, July 1967, pp. 1267–1269.

*Primary Examiner*—Ronald J. Stern
*Attorney, Agent, or Firm*—Brisebois & Kruger

[57] ABSTRACT

In place of earlier known sphericity testing techniques using accurate reference surfaces which are compared with a surface under test, this invention provides an absolute test of sphericity by making use, in effect, of the spherical wavefronts emanating from or converging to a point. A hologram plate is illuminated with coherent light from a laser to establish a first beam which forms a virtual image at the same point as that at which a beam illuminating the surface under test is focused, the illuminating beam being reflected at the surface and forming with the first beam observable interference fringes indicative of departures of the surface under test from true sphericity.

7 Claims, 1 Drawing Figure

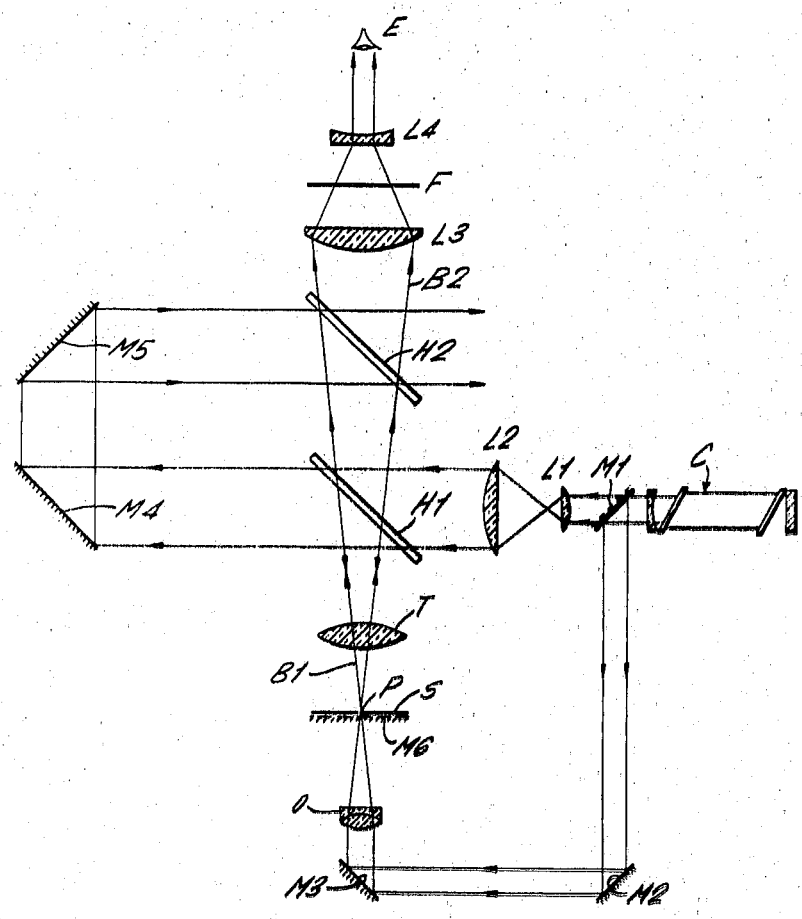

TESTING OF SPHERICAL SURFACES BY HOLOGRAPHIC INTERFERENCE

This invention relates to the testing of the sphericity of objects and is applicable to control of the manufacture of optical components such as lenses and mirrors, particularly where such components are required to have accurately spherical surfaces.

The previously known optical technique for testing surface sphericity relies upon comparing a surface under test with a reference surface of known spherical form by observing Newton's rings formed by interference between beams reflected at the two surfaces. This technique is time-consuming as it entails accurate setting-up of the surface under test and the reference surface, and is, moreover, subject to the drawback of requiring an accurately spherical reference surface. Such techniques for testing sphericity are essentially comparative, and provide an assessment of sphericity which is only as accurate as the spherical reference surface employed.

An object of the present invention is to provide an improved technique for testing sphericity which avoids the use of a spherical reference surface and which can provide an absolute measure of the sphericity of an object.

The invention in one aspect provides a method of testing the sphericity of a surface of an object, in which the object is positioned to cause reflection at said surface of at least part of a first beam of light converging to or diverging from a point and in which a hologram is so formed and positioned to establish, when illuminated with coherent light, a second beam forming a virtual image of said point coinciding with said point, so that, in the presence of the object under test the second beam and the reflected part of the first beam interfere to form interference fringes indicative of departures of the said surface of the object from true sphericity and/or from true concentricity with said point.

By placing the object under test in the convergent or divergent beam it becomes unnecessary to provide a spherical reference surface, since the interference fringes are the result of discrepancies between the surface of the object under test and the spherical wavefronts of the beam.

Preferably the said first beam is formed by a further hologram arranged to be illuminated with conherent light. Thus the method of the invention preferably includes the preliminary step of forming the further hologram by exposing a photographic plate to light from the said laser and to a pencil of light, also derived from the laser, converging to or diverging from a point focus at the said point, and subsequently processing the plate to form the further hologram.

By using holograms to form both the first and the second beams particular advantages arise, since distortion introduced, inevitably, by the optical system and the holograms, has no effect on the resulting interference fringes, which are caused only by departures of the surface under test from true sphericity. The two holograms may be illuminated by coherent light from a common laser source.

The method preferably also includes the preliminary step of forming the hologram which establishes the second beam by exposing a photographic plate to two interfering coherent light beams one of which is a divergent beam diverging from said point, and subsequently processing the plate to form the hologram. The light which illuminates the plate forming the first hologram is preferably passed through the previously formed further hologram.

In a further aspect of the invention there is provided an apparatus for testing the sphericity of a surface of an object comprising an optical system defining a first beam of light converging to or diverging from a point, means for mounting the object under test with the said first beam incident on said surface thereof, a laser source of coherent light, and a holder for a hologram plate positioned to be illuminated by said coherent light and adapted to receive a hologram plate so formed as to establish a second beam defining a virtual image of the said point coinciding with said point, whereby in the presence of the object under test the second beam and light reflected by the said surface of the object from the first beam interfere to form fringes indicative of departures of the said surface from true sphericity and/or from true concentricity with said point.

In a preferred embodiment of the invention the said optical system includes a further hologram plate holder arranged to be illuminated by coherent light from the said laser source or a further laser source, and adapted to receive a further hologram plate so formed as to establish the said convergent or divergent first beam when illuminated by the coherent light.

The invention will now be described, by way of example, with reference to the drawing accompanying the Provisional Specification, which is a diagrammatic representation of an apparatus according to one embodiment of the invention for testing, in this example, the sphericity of a convex surface of a lens.

The apparatus includes two hologram plates H1, H2, formed as hereinafter described, which are arranged to be illuminated by coherent light from a laser C from which a parallel beam is derived by beam-expanding optics comprising lenses L1, L2. After passing through the hologram plate H1 the laser beam is doubly reflected in two fixed 45° mirrors M4, M5, which may be internal faces of a single prism, to provide a parallel coherent light beam illuminating the hologram plate H2.

The hologram plate H1 is so formed that when illuminated as described above it forms a first beam B1 which converges to a point P. The convex surface T under test is located in the first beam B1 with its centre of curvature coinciding with point P. The hologram plate H2 is so formed that when illuminated as described it forms a second beam B2 diverging from the same point P: that is, a virtual image of the point P is defined at the point P by the second beam B2.

The second beam B2 enters viewing optics comprising lenses L3, L4 by means of which the virtual image formed by the second beam B2 is viewed by an observer's eye E, which also receives light reflected from the beam B1 by the convex surface T under test after transmission through the two hologram plates H1, H2.

The two hologram plates H1, H2, are formed, in the usual way, by exposure of respective photographic plates to two interfering coherent light beams. The interfering beams forming each hologram are both derived from a common source, namely the laser C.

To form the hologram plate H1 the respective photographic plate is supported in an accurately located holder and exposed to interference between the direct laser beam from the beam expanding optics L1, L2 and a divergent beam B1 derived from the laser C by way of a partially reflecting mirror M1, two 45° reflectors M2, M3 and an objective O which focusses the laser light to the point P, coinciding with a pinhole aperture in a stop S, from which the beam B1 diverges. After exposure the photographic plate is removed and processed to form the hologram plate H1 which is then replaced in its holder at the exposure position, as shown. The result of illuminating the hologram plate H1 with the same laser light from the beam-expanding optics L1, L2 is to establish a real image of the point P at the point P — that is, to establish the convergent first beam B1. This means that the light converging on point P in the beam B1 necessarily consists of spherical wavefronts, irrespective of the optical quality or precision of the optics L1, L2 or the flatness of the hologram plate H1.

The second hologram plate H2 is now formed, by exposure of a second photographic plate to two interfering coherent beams derived from the same laser source C: one beam consists of the undiffracted 'zero-order' beam from the laser C after direct transmission through the hologram plate H1 and reflection in the mirrors M4, M5. The other beam consists of a beam diverging from the point P and passing through the hologram H1. This second beam may be derived from the objective O via the apertured stop S or may be derived from the reconstructed real image formed by the hologram H1 by placing a plane mirror M6 (indicated by a broken line) at the stop S. After exposure the second photographic plate is removed from its holder, processed and replaced in the holder as the hologram plate H2.

Once the hologram plate H2 has been formed, the optical system M1, M2, M3, objective O and the stop S, including the mirror M6 if used, is removed since the two holograms H1, H2, when illuminated with coherent light as described, themselves reproduce the first and second beams B1 and B2.

The virtual image defined by the divergent second beam B2 and formed by the hologram H2 will in fact be distorted as a result of any imperfections in the hologram plates H1 and H2.

A part of the convergent first beam B1 is retroreflected at the convex surface T under test back through the hologram plates H1 and H2 and the viewing optics L3, L4 to be observed in the eye E together with the virtual image formed by the divergent second beam B2.

If the surface T under test is accurately spherical and concentric with the point P so that it coincides with the spherical wavefronts of the convergent first beam B1 incident thereon the surface T accurately retroreflects part of the beam B1. The retro-reflected part of the first beam B1 will accurately coincide with the divergent second beam B2 reproduced by the hologram H2, and no interference will be observed. If, on the other hand, the surface T under test departs from true sphericity the part of the first beam B1 which it reflects will not accurately coincide with the second beam B2, and interference will be observed by the eye E.

A neutral density filter F is included in the viewing optics to reduce the light intensity entering the eye E.

The part of the first beam B1 reflected by the test surface T will therefore have wavefronts which are distorted from true sphericity by the effect of any non-sphericity of the test surface T and by imperfections in the hologram plates H1 and H2. The distortion introduced into the reflected beam B1 by the hologram plates H1 and H2 will, however, exactly match that of the virtual image caused by the plates H1 and H2 in forming the second beam B2, so that the observed interference between the components of the two beams B1 and B2 which enter the eye E will be due solely to errors in form (that is, departures from true sphericity) of the surface T or errors of position of the surface T.

The observed interference consists of fringes corresponding to the Newton's Rings observed when testing sphericity against a physical reference spherical surface. Lateral displacement of the test surface T, or tilting thereof, results in a series of straight line fringes, the deviation from linearity of which indicates errors of shape in the surface T. Errors small in size compared with a wavelength can be observed in this way.

It will be appreciated that for testing a spherical concave surface as opposed to a convex surface as herein described, the first beam B1 incident on the surface would diverge from, rather than converge to, a point.

The range of surface curvatures which can be tested by means of the apparatus is limited by the coherence length of the laser and by the stability of the medium (usually air) through which the light beams B1 and B2 travel.

The viewing optics L3 and L4 could be suitably modified for examination of the interference fringes instrumentally, for example photoelectrically or photographically, if desired.

The interference fringes are not critically dependent on the focussing precision of the viewing optics L3, L4 since the system has a very narrow aperture due to the pinhole in the stop S. The viewing optics L3, L4 could place the direct image of the hologram plate H1 at infinity, in which case the fringes and the outline of the test surface T would be observed as sharp shadows.

In practice it may be convenient to manufacture the hologram plates H1, H2 in a separate apparatus specifically designed for this purpose. The holograms can be fitted in specially adapted holders in the testing instrument described herein according to the invention, given, of course, accurate similarity between the manufacturing and testing apparatus.

I claim:

1. A method of testing the sphericity of a nominally spherical surface of an object, comprising illuminating a first hologram with coherent light from a laser source to establish a first beam of light diverging from a point, illuminating a second hologram with coherent light from the same laser source, the second hologram being so formed and arranged that it establishes a second beam of light diverging from a virtual image coinciding with said point, positioning the object under test in the first beam with its centre of curvature at least approximately coinciding with said point, and observing interference fringes between light derived from the first beam in the presence of the object under test, and the said second beam of light derived from the illumination of the second hologram, said fringes being indicative of departures of the said surface of the object from true sphericity.

2. The method defined in claim 1, including the preliminary step of forming said second hologram by exposing a photographic plate to two interfering coherent light beams, one of which is a divergent beam diverging from said point, and subsequently processing said plate to form the second hologram.

3. The method defined in claim 1, including the preliminary step of forming said first hologram by exposing a photographic plate to light from the said laser source and to a pencil of light, also derived from said laser source, which diverges from a point focus at said point, and subsequently processing said plate to form the first hologram.

4. The method defined in claim 2, including the preliminary step of forming said first hologram by exposing a photographic plate to light from the said laser and to a pencil of light, also derived from said laser source, which diverges from a point focus at said point, and subsequently processing said plate to form the first hologram, and wherein the coherent light which illuminates said second hologram passes first through the first hologram.

5. Apparatus for testing the sphericity of a nominally spherical surface of an object, comprising: a first hologram; a laser source of coherent light; means for illuminating said first hologram with a parallel beam of coherent light from said laser source; said first hologram establishing when so illuminated a first beam diverging from a point; means mounting the object under test with said first beam incident on said surface thereof and with the centre of said surface at least approximately concentric with said point; a second hologram; means illuminating said second hologram with said coherent light from said laser source; said second hologram establishing when so illuminated a second beam diverging from a virtual image coinciding with said point, and means for observing interference fringes formed as a result of interference between the first beam in the presence of the object under test and the second beam.

6. The apparatus defined in claim 5, including reflecting elements in the path of the parallel coherent light beam after it has passed through the first hologram, said reflecting elements turning said coherent light beam through 180° prior to the illumination by said coherent light beam of the second hologram.

7. The apparatus defined in claim 5, including a beam splitting element in the path of the coherent light beam from the laser for obtaining a further coherent light beam, objective lens means in the path of said further coherent light beam for focusing said further coherent light beam to said point to diverge therefrom for the purpose of exposing a photographic plate illuminated by the first coherent light beam and by the said divergent coherent light beam in the formation of the first hologram.

* * * * *